US006645633B2

(12) United States Patent

Weller et al.

(10) Patent No.: US 6,645,633 B2

(45) Date of Patent: Nov. 11, 2003

(54) AUTODEPOSITION COMPOSITIONS

(75) Inventors: Christopher G. Weller, Royal Oak, MI (US); Elizabeth J. Siebert, Birmingham, MI (US); Zhiqi Yang, Troy, MI (US); Rajat K. Agarwal, Brighton, MI (US); William E. Fristad, Rochester Hills, MI (US); Brian D. Bammel, Rochester Hills, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/964,181

(22) Filed: Sep. 25, 2001

(65) Prior Publication Data

US 2003/0068498 A1 Apr. 10, 2003

(51) Int. Cl.$^{7}$ .......................... B32B 27/38; B05D 3/02; C08L 63/00

(52) U.S. Cl. ...................... 428/418; 428/413; 428/523; 427/386; 525/107; 525/403; 525/404

(58) Field of Search ................................ 428/413, 418, 428/523; 427/386, 299, 307, 327; 525/107, 124, 403, 404

(56) References Cited

U.S. PATENT DOCUMENTS

| | | | | |
|---|---|---|---|---|
| 3,585,084 A | | 6/1971 | Steinbrecher et al. | 148/6.2 |
| 3,592,699 A | | 7/1971 | Steinbrecher et al. | 148/6.2 |
| 3,709,743 A | | 1/1973 | Dalton et al. | 148/6.2 |
| 4,108,817 A | | 8/1978 | Lochel, Jr. | 260/29.6 |
| 4,178,400 A | | 12/1979 | Lochel, Jr. | 427/435 |
| 4,180,603 A | | 12/1979 | Howell, Jr. | 427/353 |
| 4,233,197 A | | 11/1980 | Howell, Jr. | 260/29.4 |
| 4,242,379 A | | 12/1980 | Hall et al. | 427/327 |
| 4,243,704 A | | 1/1981 | Hall et al. | 427/327 |
| 4,289,826 A | | 9/1981 | Howell, Jr. | 428/418 |
| 4,313,861 A | | 2/1982 | Bassett et al. | 260/29.6 |
| 4,347,172 A | | 8/1982 | Nishida et al. | 524/319 |
| 4,859,721 A | | 8/1989 | Oberkobusch et al. | 523/402 |
| 4,874,673 A | | 10/1989 | Donovan et al. | 428/463 |
| 5,342,694 A | | 8/1994 | Ahmed et al. | 428/461 |
| 5,472,999 A | * | 12/1995 | Kudoh et al. | 523/409 |
| 5,500,460 A | | 3/1996 | Ahmed et al. | 523/402 |
| 5,824,424 A | * | 10/1998 | Haneishi et al. | 428/626 |
| 6,096,806 A | | 8/2000 | Mueller et al. | 523/402 |
| 2002/0011309 A1 | * | 1/2002 | Agarwal et al. | 156/330 |
| 2002/0102356 A1 | * | 8/2002 | Agarwal et al. | 427/343 |

FOREIGN PATENT DOCUMENTS

| | | |
|---|---|---|
| WO | WO9930841 | 6/1999 |
| WO | WO0017269 | 3/2000 |
| WO | WO0071337 | 11/2000 |

OTHER PUBLICATIONS

The Encyclopedia of Polymer Science and Engineering (2nd Edition), vol. 6; "Epoxy Resins"; pp. 322–382.

* cited by examiner

*Primary Examiner*—Robert Dawson
*Assistant Examiner*—Michael J Feely
(74) *Attorney, Agent, or Firm*—Stephen D. Harper; Mary K. Cameron

(57) ABSTRACT

Autodeposition compositions for polymeric coatings of reduced gloss, good corrosion resistance, and uniform appearance are prepared using a combination of acrylic and epoxy resins.

22 Claims, No Drawings

AUTODEPOSITION COMPOSITIONS

FIELD OF THE INVENTION

The invention relates to autodeposition coating compositions based on epoxy resins in combination with acrylic resins and the use of such compositions to form autodeposited coatings on metallic substrates.

BACKGROUND OF THE INVENTION

Autodeposition has been in commercial use on steel for about thirty years and is now well established for that use. For details, see for example, U.S. Pat. No. 3,592,699 (Steinbrecher et al.); U.S. Pat. Nos. 4,108,817 and 4,178,400 (both to Lochel); U.S. Pat. No. 4,180,603 (Howell. Jr.); U.S. Pat. Nos. 4,242,379 and 4,243,704 (both to Hall et al.); U.S. Pat. No. 4,289,826 (Howell, Jr.); and U.S. Pat. No. 5,342,694 (Ahmed) as well as U.S. Pat. No. 5,500,460 (Ahmed et al.). The disclosures of all of these patents are hereby incorporated by reference.

Autodeposition compositions are usually in the form of liquid, usually aqueous, solutions, emulsions or dispersions in which active metal surfaces of inserted objects are coated with an adherent resin or polymer film that increases in thickness the longer the metal object remains in the bath, even though the liquid is stable for a long time against spontaneous precipitation or flocculation of any resin or polymer, in the absence of contact with active metal. "Active metal" is defined as metal that is more active than hydrogen in the electromotive series, i.e., that spontaneously begins to dissolve at a substantial rate (with accompanying evolution of hydrogen gas) when introduced into the liquid solution, emulsion or dispersion. Such compositions, and processes of forming a coating on a metal surface using such compositions, are commonly denoted in the art, and in this specification, as "autodeposition" or "autodepositing" compositions, dispersions, emulsions, suspensions, baths, solutions, processes, methods, or a like term. Autodeposition is often contrasted with electrodeposition, which can produce very similar adherent films but requires that metal or other objects to be coated be connected to a source of direct current electricity for coating to occur. No such external electric current is used in autodeposition.

One way in which autodeposition coatings have traditionally been prepared is by emulsifying a mixture containing an epoxy resin, a crosslinker, any optional additives and a solvent. The emulsified mixture is then subjected to distillation to remove solvent, resulting in the formation of an autodeposition composition made of resinous particles dispersed in water. The composition when autodeposited on a metal surface and cured forms a polymeric coating of high gloss. Unfortunately, such coatings are sensitive to coating defects such as craters and edge pullback and other defects caused by the presence of particulate matter on the substrate surface.

It would be desirable to have a composition and method of use that would form an autodeposition coating that is more resistant to pinholes, blemishes and other forms of surface defects, particularly on zinciferous surfaces, more particularly galvanized steel or some variation.

Additionally, conventional epoxy resin-based autodeposition compositions typically produce a glossy surface film when cured. Not every end user of this technology, however, desires a gloss surface. Additional processing steps or additives are generally needed to convert a conventional glossy coating to a matte or semi-gloss surface, but it would be preferable to avoid the need to use such additional steps or additives.

SUMMARY OF THE INVENTION

It has been discovered that the incorporation of dispersed acrylic resins into epoxy resin-based autodeposition compositions provides a number of unexpected advantages. Coverage of the metal parts being coated is more uniform, especially where welds are present on the surfaces of the metal parts. Leveling, flow and film formation of the coating deposited during operation of an autodeposition process are improved as compared to an autodeposition composition containing only epoxy resin. Surface gloss is reduced and may be readily controlled as desired by varying the amount of acrylic resin present as compared to the epoxy resin. Film coverage is also improved by incorporation of both an acrylic resin and an epoxy resin in an autodeposition composition. If particular reaction rinses are used to treat the uncured autodeposition film, physical properties of the cured coating may also be enhanced by the incorporation of acrylic resin.

The invention also provides an improved method of preparing an autodeposition composition containing dispersed particles of both epoxy resin and acrylic resin. If an epoxy resin dispersion and acrylic resin dispersion are simply blended together, the resulting autodeposition composition typically will initially provide autodeposited coatings of satisfactory quality. However, as the autodeposition composition is used repeatedly over a long period of time, bath instability problems are often encountered. It has unexpectedly been discovered that bath stability can be markedly improved by first contacting the acrylic resin dispersion with either a surfactant or a coalescing solvent (most preferably both a surfactant and a coalescing solvent) prior to being combined with the epoxy resin dispersion.

DETAILED DESCRIPTION OF THE INVENTION

The epoxy resins employed as one component of the autodeposition compositions of the present invention may be generally described as organic substances containing one or more (and preferably at least two) epoxide groups per molecule which are capable of reacting with a suitable curing agent to form a thermoset polymer. Such epoxy resins are well known substances and are described, for example, in the chapter entitled "Epoxy Resins" in Volume 6 of The Encyclopedia of Polymer Science and Engineering (Second Edition).

Epoxy resins are often described by the type of central organic moiety or moieties to which the 1,2-epoxy moieties are attached. Non-exclusive examples of such central moieties are those derived from bisphenol A, bisphenol F and their analogs in which one or two —$NH_2$ moieties are substituted for an equal number of —OH moieties in the bisphenol; novolak condensates of formaldehyde with phenol and substituted phenols and their amino analogs, the condensates containing at least two aromatic nuclei; triazine; hydantoin; and other organic molecules containing at least two hydroxyl and/or amino moieties each, in each instance with as many hydrogen atoms deleted from hydroxy and/or amino moieties in the parent molecule as there are epoxy moieties in the molecules of epoxy resin. Optionally, the 1,2-epoxide moieties may be separated from the central moieties as defined above by one or more, preferably only one, methylene groups. Oligomers of such monomers, either with themselves or with other organic molecules containing at least two hydroxyl and/or amino moieties each, may also serve as the central organic moiety.

Epoxy resins useful for the present invention include glycidyl ethers of a polyhydric phenol, such as bisphenol A (a particularly preferred species of polyhydric phenol), bisphenol F, bisphenol AD, catechol, resorcinol, and the like.

Primarily for reasons of economy and commercial availability, it is generally preferred to utilize epoxy resins derived from bisphenol A in this invention. More particularly, epoxy moiety containing molecules utilized in this invention preferably conform to the general chemical formula:

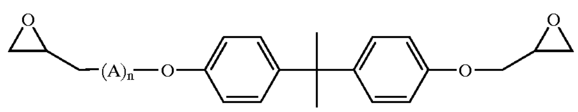

where:

A =

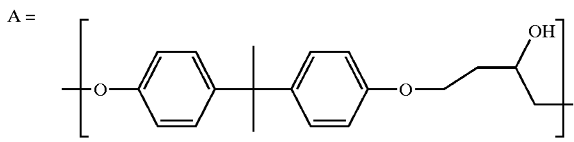

and "n" is an integer from 0 to 50. Commercially available epoxy resins of this type are normally mixtures of molecules having somewhat different n values and different numbers of epoxy groups. Preferably, the epoxy resin mixture used has a number average molecular weight in the range of from about 350 to about 5000, more preferably in the range from about 400 to about 3000. Preferably, the average number of epoxide groups per molecule in the epoxy resin mixture is in the range from 1.7 to 2.5, more preferably in the range from 1.9 to 2.1.

Particularly useful as the epoxy resin component of the present invention are chain-extended epoxy resins, such as those described in copending application U.S. Ser. No. 09/578,935, filed on May 25, 2000, the disclosure of which is herein incorporated by reference in its entirety.

In chain-extended resins, a chain extender is utilized to react individual epoxy resin molecules through their epoxy groups so as to form a polymer which is higher in average molecular weight than the starting epoxy resin(s). In this embodiment of the invention, the starting epoxy resin(s) may have a relatively low epoxide equivalent weight (e.g., from about 75 to about 400). Glycidyl ethers of bisphenol A (such as those described herein previously) are particularly preferred for use as a starting epoxy resin. For reasons that are not well understood, "prereacting" the epoxy resin(s) in this manner leads to improvements in the quality and performance of the final autodeposited coating as compared to simply using a dispersion of the epoxy resin(s) in unreacted form. This is particularly true where at least one of the epoxy resins is a flexibilizing epoxy resin.

A "flexibilizing epoxy resin" may be defined as an epoxy resin which when cured by itself with diethylene triamine (DETA) has a durometer Shore D reading not greater than 45. Suitable flexibilizing epoxy resins include those compounds containing at least one epoxide group per molecule and one or more groups capable of increasing the flexibility of the cured autodeposited coating such as, for example, long aliphatic chains (e.g., polymethylene chains corresponding, for example, to the structure —$(CH_2)_n$— wherein "n" is preferably greater than 3, more preferably greater than 6. The polymethylene chains can be in the backbone of the flexibilizing epoxy resin and/or pendent thereto), polyester chains (especially those formed by condensation of aliphatic diacids and glycols or glycol oligomers), polyoxyalkylene chains (e.g., polyether chains corresponding to the structure $((CH_2)_n$—CHR—O—$)_m$—, where: "n" is 0–3, "m" is 2 or greater, and R is H or alkyl), and the like. A particularly preferred flexibilizing epoxy resin is a difunctional epoxy derived from cardanol (a phenol substituted with a long chain unsaturated hydrocarbon group which is obtained from cashew nut oil) having an epoxy equivalent weight of about 350.

In one embodiment of the invention, the average molecular weight is increased through chain extension at least 100%, more preferably at least about 200%, relative to the initial average molecular weight of the starting epoxy resin or combination of epoxy resins. The chain extender thus should contain at least two functional groups capable of reacting with said epoxy group such as, for example, hydroxy, carboxylic acid, carboxylic acid anhydride or the like. In one embodiment of the invention, the chain extender is a polyhydric phenol such as bisphenol A. Alkoxylated polyhydric phenols such as SYNFAC 8009 (available from Milliken Chemical) may also be used as chain extenders. Suitable chain extenders additionally include dicarboxylic acids such as adipic acid.

In one embodiment of the invention a diglycidyl ether of a polyhydric phenol such as bisphenol A is used in combination with a chain extender which contains one or more flexibilizing segments such as polymethylene, polyester or polyoxyalkylene segments. For example, a polyether polyol such as polypropylene glycol, polyester polyol (hydroxy and/or carboxylic acid terminated), dimer fatty acid, long chain dicarboxylic acid (e.g., decanedioic acid), long chain diol (e.g., 1,12-decanediol), or the like could be used.

The stoichiometry of chain extender(s) to epoxy resin(s) is adjusted depending upon the degree of condensation (i.e., chain extension) desired in the reaction product which is to be used as the epoxy resin component in the autodeposition coating of the present invention. Typically, however, the amount of epoxy resin(s) is kept in slight to moderate excess relative to the amount of chain extender(s). For example, the equivalents of epoxy groups in the epoxy resin(s) may be about 5% to about 50% greater than the equivalents of active hydrogen groups in the chain extender(s). The reaction product formed thus will contain unreacted epoxy groups (i.e., the reaction product will be epoxy-functionalized). The reaction product will also contain hydroxy (—OH) groups, which may be present in the initial epoxy resin(s) or which may be formed as a consequence of the reaction between the chain extender and the epoxy groups of the epoxy resin.

The epoxy resin(s) and chain extender(s) are reacted for a time and at a temperature effective to cause the desired degree of condensation and chain extension. In one embodiment of the invention, for example, the epoxide equivalent weight of the reaction product formed will be in the range of at least about 1000, preferably at least about 1500, as compared to epoxide equivalent weights for the starting epoxy resin reactant(s) of from about 75 to about 400. Such conditions will vary depending upon the relative reactivities of the components and other factors, but may be optimized without undue experimentation.

Catalysts capable of accelerating the desired epoxy group reaction with the chain extender such as phosphines, amines and other basic substances may be utilized if so desired in order to reduce the reaction time and/or temperature required. The reaction may be carried out in the presence of a solvent capable of dissolving both the epoxy resin(s) and the chain extender(s) such as, for example, an inert organic solvent (e.g., aromatic hydrocarbons, ketones). It is recognized that in certain embodiments of the invention, some portions of the starting materials may remain unreacted and thus may be present in such form when the reaction product is used in the autodeposition composition described herein.

In one desirable embodiment of the invention, the reaction product derived from the epoxy resin(s) and chain extender(s) is prepared prior to forming an emulsion of said reaction product in water. A solution of the reaction product in one or more organic solvents is emulsified with water in the presence of one or more emulsifiers to form an organic solvent-containing intermediate emulsion. The organic solvent(s) used in said emulsification step may be the same as or different from the organic solvent(s) used when reacting the epoxy resin(s) and chain extender(s). Other desired components of the autodeposition composition such as epoxy curing agents, coalescing agents, flow control additives (leveling agents), and the like (to be described herein later in more detail) may also be incorporated into the emulsion, either as components predissolved in the organic (solvent) phase or added separately to the emulsion. Preferably, the organic solvent is subsequently removed from the emulsion by distillation or similar method.

The autodeposition compositions of the present invention also contain one or more substances capable of reacting with the epoxy resin component to provide a crosslinked polymeric matrix in the cured autodeposited coating. Such substances will be generally referred to herein as "epoxy curing agents." In a preferred embodiment of the invention, at least a portion of curing agents that only react with the epoxy resin component at the elevated temperatures typically encountered during the curing stage of the present autodeposition composition (e.g., temperatures greater than 100° C.). Such curing agents are often referred to in the art as "latent" curing agents or hardeners because they only become activated when heated to a temperature well in excess of normal room temperatures. The use of latent epoxy curing agents is preferred in the present invention so that substantial crosslinking of the epoxy resin may be avoided prior to and during the deposition of the autodeposition composition on the surface of a metallic article, which typically is carried out at temperatures in the range of from about 20° C. to about 60° C. However, if so desired, minor amounts of more reactive epoxy curing agents may also be present in addition to the latent epoxy curing agents so as to accomplish partial epoxy resin crosslinking prior to autodeposition The preferred epoxy curing agents are generally selected so as to be capable of reacting with hydroxyl groups and/or intact epoxide groups which are present in the epoxy resin component. It is believed that due to the relatively acidic aqueous environment experienced during actual operation of an autodeposition bath, most, or all, of the epoxide groups initially present in the epoxy resin component are hydrolyzed to produce hydroxyl groups. Moreover, certain types of epoxy resins will contain hydroxyl groups even before any such epoxide hydrolysis takes place.

Examples of suitable preferred epoxy curing agents include (a) molecules that contain: at least two epoxy and/or hydroxyl-reactive functional groups, such as amine, amide, imine, thiol, hydroxyl, carboxyl, and carboxylic acid anhydride, and (b) molecules that contain at least two blocked isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature in excess of 100° C. Examples of such blocked isocyanates are described in U.S. Pat. Nos. 5,500,460 and 6,096,806, the disclosures of which are herein incorporated by reference in their entirety.

Briefly described, the blocked isocyanates of U.S. Pat. Nos. 5,500,460 and 6,096,806 are chosen from molecules that conform to general formula:

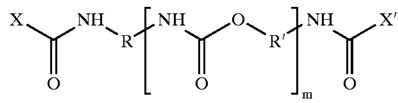

wherein:

each of X and X' independently is a monovalent moiety formed by removing the most easily ionized hydrogen atom from an amine, alcohol, amide, or oxime molecule, or X and X' are joined to each other to form a uretdione;

each of R and R' independently is a divalent hydrocarbon or carbonyl-hydrocarbon moiety derived by removing from any hydrocarbon, or from an oxyhydrocarbon in which all oxygen atoms present are in carbonyl groups, any two hydrogen atoms not attached to the same carbon atom, said divalent hydrocarbon or carbonyl-hydrocarbon moiety having from 2 to 20 carbon atoms and having no unsaturation except aromatic and carbonyl unsaturation; and m is an integer from 0–20, preferably, within the range of 1–15.

The blocking groups X and X', which preferably are the same or are joined to form a uretdione, can be derived from any suitable aliphatic, cycloaliphatic, aromatic, or alkylaromatic monoalcohol, monoamide, monoamine, or monooxime. Ketoximes are especially useful when unblocking at relatively low temperatures such as 120° C. is desired. More sterically hindered and/or more acid stable blocking groups, such as those derived from the lactam of 6-aminohexanoic acid and/or benzotriazole are preferred if unblocking is desired to begin at a substantial rate only at or above 160° C.

The use of isophorone diisocyanate (IPDI)-based, epsilon-caprolactam blocked isocyanates as epoxy curing agent, such as the product sold by Huels under the trademark VESTAGON B1530, is particularly preferred. If a blocked isocyanate-type epoxy curing agent is utilized, the ratio of blocked isocyanate groups to hydroxy groups (NCO:OH) typically will be in the range of about 0.05 to about 1.2, more preferably about 0.1 to about 0.5. Other examples include blocked hexamethylene diisocyanates (HMDI). In one embodiment of the invention, the epoxy curing agent and epoxy resin are contained in the same molecule. Blocked isocyanate-beaming epoxy resins are described, for example, in U.S. Pat. No. 4,859,721, incorporated herein by reference in its entirety.

The acrylic resins employed as a component of the autodeposition compositions of the present invention may be generally described as polymeric substances obtained by polymerization of one or more acrylic monomers, possibly in combination with one or more non-acrylic monomers, which provide a stable (e.g., non-coagulating) autodeposition bath and yet are capable of forming an autodeposited adherent film comprised of the acrylic resin of the surface of an active metal when placed in contact with the surface in the presence of an autodeposition accelerator. Acrylic monomers include acrylic acid, methacrylic acid, esters of these acids (especially $C_1$–$C_8$ alkyl esters), acrylonitrile, methacrylonitrile, acrylamide, methacrylamide, and the like. Suitable non-acrylic monomers which may be copolymerized with the acrylic monomer(s) include vinyl aromatic monomers, polymerizable ethylenically monounsaturated monomers, hydroxy group-containing polymerizable vinylenically unsaturated monomers, polymerizable vinylenically polyunsaturated monomers, and vinyl esters of carboxylic acids such as vinyl acetate. The preparation of such acrylic resins is well-known in the art. Preferably, the acrylic resin selected for use is in dispersed or latex form (i.e., fine particles stably dispersed in an aqueous medium).

Suitable acrylic resins may be readily obtained from commercial sources, with especially preferred acrylic resins including MAINCOTE TL-5 and MAINCOTE AE-58 (both products of Rohm & Haas), AQUAMAC 705 (a product of McWhorter), RHOPLEX WL-91, B-85 and 1822 (products of Rohm & Haas), NEOCRYL A633, A621, and A640 (products of Zeneca), NACRYLIC 78–6391, 78–6408, 78–3936 and 78–6334 (products of National Starch & Chemical Co.) and 76 Resin 1018 and 6033 (products of Unocal). MAINCOTE TL-5 acrylic resin is particularly preferred. Other suitable acrylic resins may be readily identified by running autodeposition tests using a candidate resin to determine if that resin a) forms a stable autodeposition bath, b) coats onto the surface of an active metal in the presence of an autodeposition accelerator and c) provides an adherent wet film that is not readily rinsed from the active metal surface.

Less suitable acrylic resins include RHOPLEX 1950, AC-64, TR 407, HA-8, HA-12, and B-60A (products of Rohm & Haas), CMD-9790 (a product of Hi-Tek), NACRYLIC 78–6354 and 78–6207 (products of Zeneca), 76 Resin 6510, Z6106, ST 6004, and VC 60012 (products of Unocal), and SACI RP-215A (a product of Witco Chemical).

The weight of acrylic resin to the total weight relative to epoxy resin and epoxy curing agent used in the present invention is not believed to be especially critical. However, at acrylic resin: (epoxy resin and epoxy curing agent) ratios of less than 5:95, little or no effect on the properties of the cured autodeposited coating compared to a coating containing only the epoxy resin component will generally be observed. Additionally, the corrosion resistance of the cured autodeposition coating will often start to be detrimentally affected when the acrylic resin: (epoxy resin and epoxy curing agent) ratio is in excess of 60:40. Acrylic resin: (epoxy resin and epoxy curing agent) ratios in the range of from 10:90 to 50:50 will usually be preferred. As acrylic resin-based autodeposited coatings are known to have inferior corrosion resistance properties as compared to other epoxy resin-based autodeposition resins, it was surprising that in the present invention the addition of acrylic resin at moderate levels does not significantly affect corrosion resistance.

The autodeposition accelerator component is a substance such as an acid, oxidizing agent, and/or complexing agent capable of causing the dissolution of active metals from active metal surfaces in contact with the autodeposition composition. The autodeposition accelerator component is preferably chosen from the group consisting of hydrofluoric acid and its salts, fluosilicic acid and its salts, fluotitanic acid and its salts, ferric ions, acetic acid, phosphoric acid, sulfuric acid, nitric acid, hydrogen peroxide, peroxy acids, citric acid and its salts, and tartaric acid and its salts. Preferably, an accelerator component is selected which is sufficient in strength and amount to impart to the autodeposition composition an oxidation-reduction potential that is at least 100 millivolts more oxidizing than a standard hydrogen electrode.

The autodeposition accelerator component may be selected from any material or combination of materials known for this purpose in prior autodeposition art or otherwise found to give satisfactory results. The most preferred autodeposition component accelerator contains the following three subcomponents:

(C1) a concentration of fluoride ions that in a working autodeposition bath is at least, with increasing preference in the order given, 0.4, 0.8, 1.0, 1.2, 1.40, or 1.60 grams of fluoride ions per liter of total autodeposition bath, a concentration unit that may be used hereinafter for any other constituent as well as for fluoride ions and is hereinafter usually abbreviated as "g/l" and independently preferably is not more than, with increasing preference in the order given, 5, 4.0, 3.6, 3.3, or 3.0 g/l of fluoride ions (the entire fluorine atoms content of any source of fluorine in anions dissolved in an autodeposition bath according to the invention is to be considered as fluoride ions for the purpose of testing conformance to these preferred concentrations of fluoride ions, irrespective of the actual extent of ionization, aggregation, formation of complex ions, or the like that may occur);

(C2) an amount of oxidizing agent, preferably selected from the group consisting of hydrogen peroxide and ferric ions, sufficient to provide to the working autodepositing liquid composition an oxidation potential, measured by the potential of a platinum or other inert metal electrode in contact with the autodepositing liquid composition, that is, with increasing preference in the order given, at least 150, 175, 200, 225, or 250 mV more oxidizing than a standard hydrogen electrode and independently preferably is, with increasing preference in the order given, not more than 550, 525, 500, 475, or 450 mV more oxidizing than a standard hydrogen electrode; and (C3) a source of hydrogen cations in an amount sufficient to impart to the autodeposition bath a pH that is at least, with increasing preference in the order given, 1.0, 1.4, 1.6, 1.8, or 2.0 and independently preferably is not more than, with increasing preference in the order given, 3.8, 3.6, 3.2, 3.0, 2.8, or 2.6.

It should be understood that subcomponents (C1) through (C3) need not all be derived from different materials. Hydrofluoric acid, in particular, is preferred as a source for both (C1) and (C3), and ferric fluoride, which can be made by dissolving iron in hydrofluoric acid, can supply both (C1) and (C2).

Most preferably, ferric cations, hydrofluoric acid, and hydrogen peroxide are all used to constitute the autodeposition accelerator component. In a working composition according to the invention, independently for each constituent: the concentration of ferric cations preferably is at least, with increasing preference in the order given, 0.5, 0.8, or 1.0 g/l and independently preferably is not more than, with increasing preference in the order given, 2.95, 2.90, 2.85, 2.80, or 2.75 g/l; the concentration of fluorine in anions preferably is at least, with increasing preference in the order given, 0.5, 0.8, 1.0, 1.2, 1.4, 1.50, 1.55, or 1.60 g/l and independently preferably is not more than, with increasing preference in the order given, 10, 7.0, 5.0, 4.0, or 3.0 g/l; and the amount of hydrogen peroxide added to freshly prepared working composition preferably is at least, with increasing preference in the order given, 0.050, 0.10, 0.20, 0.30, or 0.40 g/l and independently preferably is not more than, with increasing preference in the order given, 2.1, 1.8, 1.5, 1.2, 1.00, 0.90, or 0.80 g/l.

The autodeposition compositions of the present invention may also contain one or more additional ingredients. Such additional ingredients may include surfactants (emulsifying or dispersing agents), fillers, biocides, foam control agents, flow control (leveling) agents, pigments and/or colorants. The concentrations of these various additional ingredients may be selected in accordance with the concentrations of corresponding components used in conventional epoxy resin-based autodeposition compositions, such as, those described in U.S. Pat. Nos. 5,500,460 and 6,096,806 and U.S. Ser. No. 09/578,935.

The surfactant should be selected and should be present in sufficient concentration to emulsify or disperse the water-insoluble part of any other component of the autodeposition composition so that no separation or segregation of bulk phases that is perceptible with normal unaided human vision occurs during storage at 25° C. for at least 24 hours after preparation of the autodeposition composition, in the absence of contact of the autodeposition composition with any active metal. Anionic surfactants are generally preferred, although amphoteric as well as nonionic surfactants may also be utilized. Combinations and mixtures of different surfactants may be employed. Preferred anionic surfactants for use in the present invention are ether sulfates that conform to general formula:

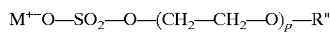

$$M^{+-}O—SO_2—O—(CH_2—CH_2—O)_p—R''$$

wherein:

M represents a monovalent cation or monovalent fraction of a cation of higher valence, preferably sodium or ammonium, more preferably ammonium;

p is a positive integer that preferably is at least, with increasing preference in the order given, 2, 3, or 4; and R" represents an alkyl or alkylaryl moiety, more preferably an alkyl phenol moiety. Independently, R" preferably has 8–30 and preferably has 15–20 carbon atoms. Suitable commercially available anionic emulsifiers include Dowfax™ 2A-1 (sodium salt of alkylated diphenyl oxide disulfonate); Abex™ 26-5; Texapon™ E-12 and K-12; Rhodapex™ CO-128, -433, and -436 and EP-100, -110, -115, -120, and -227; Disponsil™ AES-13, and Aerosol™ OT (sodium dioctylsulfosuccinate).

The single most preferred anionic emulsifying agent is Rhodapex™ CO-436, which is reported by its supplier to be an ammonium salt of sulfonated nonylphenol ethoxylate and to contain 58% of this active ingredient.

Water is generally used as the carrier or medium for the autodeposition compositions of the present invention, although one or more organic solvents may also be present. Preferably, however, the autodeposition compositions are substantially free of volatile solvents.

The epoxy resin, acrylic resin, epoxy curing agent and other components may be dissolved in solvent and the resulting solution emulsified in water. The solvent component may then be removed from the emulsion by distillation under reduced pressure to yield a dispersion (i.e., fine particles comprised of acrylic resin, epoxy resin, and epoxy curing agent dispersed in an aqueous medium). However, in many cases the solvents do not diminish the technical benefits of the final autodeposition compositions according to the invention and may be left in place in the autodeposition composition. Any such residual solvent will normally be expelled during the elevated temperatures found in the curing stage at the end of the autodeposition process.

The most preferred solvents for such purpose are mixtures of (i) aromatic hydrocarbons with from 6 to 10 carbon atoms and (ii) ketones with from 3 to 8 carbon atoms. Preferably, the amount of solvent used to mix the materials is at least 10 wt % of the combined weight of the components without water. The most preferred solvents are toluene and methyl isobutyl ketone (MIBK).

Generally, the presence of a coalescing agent component in an autodeposition composition according to the invention is preferred. This component is preferably selected from the group consisting of monoethers and monoesters of glycols, preferably glycols with at least one terminal hydroxy group. Monoethers of ethylene glycol are readily available and effective in blistering reduction but are restricted in use by antipollution laws in many locations and also have been found to be more likely than monoethers of propylene glycol to destabilize the emulsions formed in products according to the invention, so that monoethers of propylene glycol, particularly the methyl, t-butyl, n-butyl and phenyl monoethers of propylene glycol, dipropylene glycol and tripropylene glycol are preferred from this class.

Monoesters are slightly less preferred than monoethers where maximum corrosion resistance in the final product is needed, but are generally effective at lower concentrations and may therefore be preferred if economy and/or compliance with stringent solvent emission standards is more important than maximum corrosion resistance. A particularly preferred monoester is 2,2,4-trimethyl-1,3-pentanediol mono isobutyrate.

Pigments, filler components or soluble colorants may generally be selected for compositions according to this invention from materials established as satisfactory for similar uses in other autodepositing liquid compositions. Suitable materials include carbon black, phthalocyanine blue, phthalocyanine green, quinacridone red, hansa yellow, and/or benzidine yellow pigment, and the like.

If the acrylic resin dispersion and epoxy resin dispersion are separately prepared prior to combining to form the autodeposition compositions of the present invention, it will generally be very advantageous to "condition" the acrylic resin dispersion before combining with the epoxy resin dispersion. In the conditioning step, a surfactant or coalescing solvent (most preferably, both a surfactant and a coalescing agent) are contacted with the acrylic resin dispersion. Without wishing to be bound by theory, it is believed that these components are adsorbed or absorbed by (or otherwise somehow associate with) the acrylic resin particles in the dispersion, thereby making the acrylic resin dispersion more compatible with the epoxy resin dispersion. The effect of this conditioning step is generally to improve the bath stability of the autodeposition composition. That is, an autodeposition bath remains stable over a longer period of time when used to repeatedly deposit coatings on a series of metal articles if the acrylic resin dispersion is preconditioned. Preferably, the surfactant used in the conditioning step is the same surfactant, or at least is selected from the same class of surfactants, as the surfactant used to prepare the epoxy resin dispersion. While the amount of surfactant used in this conditioning step will vary depending upon the acrylic resin selected and the efficacy of the surfactant, typically from about 0.2 to about 10% by weight surfactant (based on the solids content of the acrylic resin dispersion) will be suitable. Preferably, the coalescing solvent is the same coalescing solvent, or at least selected from the same class of coalescing solvents, as the coalescing solvent used to prepare the epoxy resin dispersion. While the amount of coalescing solvent used in this conditioning step will vary depending upon the acrylic resin selected, the efficacy of the coalescing solvent selected, and the properties of the cured autodeposited coating which are desired, typically from about 0.5 to about 10% by weight coalescing solvent (based on the solids content of the acrylic resin dispersion) will be suitable. Generally speaking, the surfactant and/or coalescing agent are preferably contacted with the acrylic resin dispersion at a temperature of from about 20° C. to about 50° C. for a time (prior to combining with the epoxy resin dispersion) of from about 0.1 hours to about 10 hours.

An autodeposition composition that is to be stored for several weeks or more before use preferably does not contain any autodeposition accelerator(s), since such autodeposition accelerators are usually detrimental to the storage stability of the autodeposition composition.

A coating process according to this invention will preferably comprise the steps of: (a) contacting an object with an active metal surface with the aforedescribed autodeposition composition and one or more autodeposition accelerators for a sufficient time to cause the formation of a wet film comprised of acrylic resin and epoxy resin particles of a predetermined thickness on the metal surface, (b) separating the coated metal surface from contact with the autodeposition bath composition, (c), optionally, rinsing the coated metal surface to remove at least some of the absorbed but otherwise unadhered components of the bath composition from the more adherent portion of the coating, and (d) heating the surface to form a final cured coating. Without wishing to be bound by theory, it is believed that when the wet adherent coating is heated, the epoxy resin and epoxy curing agent present in the film react to form a thermoset polymeric matrix. Depending upon the functionality of the acrylic resin used, some reaction of the acrylic resin may also take place.

Ordinarily a metal surface preferably is degreased and rinsed with water before applying an autodeposition composition. Conventional techniques for cleaning and degreasing the metal surface to be treated according to the invention can be used for the present invention. The rinsing with water can be performed by exposure to running water, but will ordinarily by performed by immersion for from 10 to 120 seconds, or preferably from 20 to 60 seconds, in water at ordinary ambient temperature.

Any method can be used for contacting a metal surface with the autodeposition composition of the present invention. Examples include immersion (e.g., dipping), spraying or roll coating, and the like. Immersion is usually preferred.

Preferably, contact between an active metal surface and the autodeposition bath compositions of this invention is for a time between about 0.5 and about 10 minutes, more preferably between about 1 and about 3 minutes. Contact preferably is long enough to produce a final film thickness of from about 10 to about 50 microns (preferably about 18 to about 25 microns). Generally, the thickness of the coating will be directly proportional to the contact time.

Optionally, a reagent capable of causing additional desirable reactions in or modifications of the coated film may be included in the rinse used after cessation of contact between the wet coated surface and the bulk of the autodeposition bath composition. Such a reagent may also be brought into contact with the wet coated film after rinsing with water alone. Although the autodeposition bath compositions of the invention generally produce wet coated films that can be heated after simple rinsing with tap or deionized water to give good quality cured coatings, the corrosion resistance of the cured coating may be further improved by rinsing with an aqueous solution comprising an alkaline earth metal compound such as calcium nitrate as described in copending applications Ser. No. 09/578,935, filed May 25, 2000, and Serial No. 60/252,799, filed Nov. 22, 2000, and which are incorporated herein by reference in their entirety. The reaction rinses described in Serial No. 60/252,799 are preferred where maximum uniformity in the surface appearance of the cured autodeposited coating is desired. Other reaction rinses known in the autodeposition art may also be used.

Final heating of the rinsed wet coated and optionally post-treated autodeposited film is preferably at a temperature of greater than 100° C. The curing temperature must be sufficiently high so as to effect reaction of the epoxy curing agent present in the autodeposited film. Generally, the final heating temperature is selected to dry and cure the coating at a temperature within the range from at least about 100° C. to about 300° C., more preferably between about 130° C. and 240° C., for a time of about 3 to about 60 minutes, more preferably for about 10 to about 50 minutes.

The heating can be performed in multiple stages, if desired. For example, in a first stage lasting from about 5 to about 15 minutes, the coated substrate is heated to a peak temperature of about 55° C. to about 65° C. to flash off most of the residual water in the coating and in a second stage lasting from about 30 to about 50 minutes, the coated substrate is heated to a peak temperature of about 175° C. to about 195° C. The peak temperature preferably is attained in preferably, no more than about 10 minutes after the first heating stage has been completed.

Autodeposition compositions employed in the present invention can be used for treating surfaces of iron, zinc, iron alloy and zinc alloy, and particularly steel portions of various components such as automobile sheet components and automobile components such as shock absorbers, jacks, leaf springs, suspension components and brackets, and the like, and components of furniture such as drawer rails, and the like. Autodeposition coatings are particularly well suited for indoor metal furniture that is subjected to wear and surface impacts, e.g., filing cabinets, filing shelves, desks, etc.

EXAMPLE

A replenisher composition in accordance with-the present invention is prepared using the following components:

| Component | Weight (g) |
|---|---|
| Acrylic Resin Dispersion | 260.15 |
| Coalescing Solvent | 8.53 |
| Surfactant | 4.44 |
| Epoxy Resin Dispersion | 691.32 |
| Pigment | 28.55 |
| Deionized Water | 7.00 |
| Total | 1000.00 |

The acrylic resin dispersion is MAINCOTE TL-5 (41.5 wt % solids), a product sold by Rohm & Haas which is reported to have a pH of 7.5, a viscosity of 200 to 1000 cps, and equivalent weight (in solids) of 1700. MAINCOTE TL-5 is an acrylic resin derived in part from acrylonitrile monomer. The coalescing solvent is 2,2,4-trimethyl-1, 3-pentanediol monoisobutyrate sold under the trademark TEXANOL by Eastman Chemical Company. The surfactant is an ammonium salt of sulfonated nonyl-phenol ethoxylate (58% active) sold under the trademark RHODAPEX CO-436 by Rhodia Chemie. The epoxy resin dispersion is unpigmented AUTOPHORETIC 901, a product containing 60.0% solids (including blocked isocyanate epoxy curing agent) and sold by the Surface and Technologies division of Henkel Corporation. A description of the preparation of epoxy resin dispersions such as AUTOPHORETIC 901 may be found in co-pending application Ser. No. 09/578,935, filed May 25, 2000. The pigment is a carbon black dispersion (41.0 weight % solids) sold under the trademark AQUABLACK 255 by the Binney and Smith Company.

The components are combined in accordance with the following procedure. The acrylic resin dispersion is loaded into a clean mixing vessel. Under medium speed agitation, the coalescing solvent is added. Within 5 minutes of the addition of the coalescing solvent, the surfactant is added. After mixing for two hours to condition the acrylic resin dispersion, the epoxy resin dispersion is added. After mixing for another 30 minutes, the pigment is added and mixing is continued until the carbon black is well dispersed (ca. 30 minutes). Samples are withdrawn to determine the % non-volatiles in the replenisher composition and water is added as needed to achieve a % nonvolatiles value of 37.0. The finished product is filtered through a 30 micron filter bag. The weight ratio of acrylic resin: (epoxy resin and epoxy curing agent) (based on the solids content of the dispersions used) is 30:70.

A working autodeposition composition is prepared from the replenisher composition described above as follows. The replenisher composition (243.24 g), water (450.00 g), and AUTOPHORETIC starter 300 (75.00 g; this is a product containing autodeposition accelerators and other components sold by the Surface and Technologies division of Henkel Corporation) are added to a suitable container under agitation, followed by sufficient water to adjust the % nonvolatiles content of the autodeposition composition to 6.0.

In accordance with the foregoing description, a series of tests using blends of various commercially available acrylic resin dispersions with AUTOPHORETIC 901 epoxy resin-based autodeposition replenisher (available from the Surface and Technologies Division of Henkel Corporation, Madison Heights, Mich.) to coat precleaned ACT cold rolled steel panels was run to demonstrate the effect of acrylic resin on the quality of the cured autodeposited coating.

The parameters of the working autodeposition compositions were controlled as follows:

| | |
|---|---|
| Redox Value (ORP) | 325–375 mV |
| LINEGUARD 101* Meter Reading | 150–200 microamperes |
| Total Solids (% NV) | 5.5–6.5% (Target = 6.0%) |
| Wet Coating Solids | 30–50% (Target = 35%) |
| Starter Titration | 22–32 mL |
| Bath Temperature | 20–22° C. (68–72° F.) |

*LINEGUARD 101 meters are available from the Surface Technologies division of Henkel Corporation Table 1 summarizes the results obtained. The surface gloss of the cured autodposited coating was significantly reduced as the concentration of acrylic resin was increased. Corrosion resistance (as measured by 168 hour salt spray testing) either remained unaffected or actually improved when acrylic resin was introduced into the autodeposition bath. When subjected to a 168 hour Cleveland Humidity test, all of the coatings exhibited a blister rating of Vf9 and an adhesion value of 5b.

TABLE 1

| Example No. | Acrylic Resin | Acrylic Resin, wt %[8] | Gloss (60°)[6] | 168 Hr Salt Spray[7] |
|---|---|---|---|---|
| 1[1] | — | 0 | 90+ | 2.5 mm (0.76 mil) |
| 2 | A[2] | 10 | 85 | 1.8 mm (0.67 mil) |
| 3 | A | 20 | 35 | 2.6 mm (0.79 mil) |
| 4 | B[3] | 10 | 65 | 1.9 mm (0.68 mil) |
| 5 | B | 20 | 80 | 1.8 mm (0.67 mil) |
| 6 | C[4] | 5 | 90+ | 2.1 mm (0.75 mil) |
| 7 | C | 10 | 85 | 1.9 mm (0.65 mil) |
| 8 | C | 20 | 55 | 2.3 mm (0.73 mil) |
| 9 | D[5] | 10 | 80 | 1.8 mm (0.90 mil) |
| 10 | D | 20 | 50 | 1.8 mm (0.98 mil) |

[1]Comparative example
[2]AQUAMAC 705, an acrylic resin supplied by McWhorter
[3]MAINCOTE AE-58, an acrylic resin supplied by Rohm & Haas
[4]MAINCOTE TL-5, an acrylic resin supplied by Rohm & Haas
[5]NEOCRYL A633, an acrylic resin supplied by Zeneca
[6]Gloss (60° meter) was measured on a minimum of 2 panels per variation
[7]Salt spray testing was performed on two panels per variation
[8]Calculated based on the total solids weight of epoxy resin + epoxy curing agent + acrylic resin

What is claimed is:

1. An autodeposition composition comprising:
(a) water;
(b) at least one epoxy resin in dispersed form;
(c) at least one acrylic resin in dispersed form; and
(d) at least one epoxy curing agent;
wherein said epoxy resin, said acrylic resin, and said epoxy curing agent are present in a weight ratio of acrylic resin: (epoxy resin+epoxy curing agent) of from 5:95 to 60:40.

2. The autodeposition composition of claim 1 comprising at least one epoxy resin prepared by reacting a diglycidyl ether of a polyhydric phenol, a flexibilizing epoxy resin, and a chain extender containing at least two epoxy reactive groups selected from hydroxyl, carboxylic acid, carboxylic acid anhydride and combinations thereof.

3. The autodeposition composition of claim 2 wherein the polyhydric phenol is bisphenol A.

4. The autodeposition composition of claim 2 wherein the flexibilizing epoxy resin is a glycidyl ether derived from cardanol.

5. The autodeposition composition of claim 2 wherein the chain extender is a polyhydric phenol.

6. The autodeposition composition of claim 1 comprising one or more epoxy resins conforming to the general chemical structure:

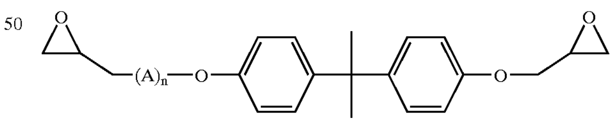

where A is

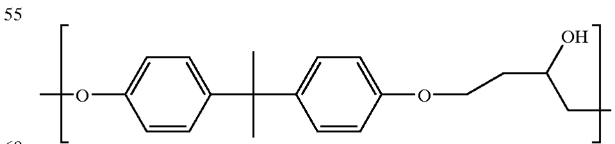

and "n" is 0 or an integer from 1 to 50.

7. The autodeposition composition of claim 1 additionally comprising at least one further component selected from the group consisting of surfactants, autodeposition accelerators, colorants, coalescing solvents, leveling agents, and combinations thereof.

8. The autodeposition composition of claim 1 additionally comprising at least one autodeposition accelerator.

9. The autodeposition composition of claim 1 wherein at least one epoxy curing agent is a blocked isocyanate.

10. The autodeposition composition of claim 1 wherein said epoxy resin, said acrylic resin, and said epoxy curing agent are present in a weight ratio of acrylic resin: (epoxy resin+epoxy curing agent) of from 10:90 to 50:50.

11. The autodeposition composition of claim 1 wherein at least one acrylic resin is contacted in dispersion form with at least one additive selected from the group consisting of surfactants and coalescing solvents before being combined with the epoxy resin and epoxy curing agent.

12. A metallic substrate coated by the autodeposition composition of claim 1.

13. A method of forming a coating on a metallic substrate, said method comprising contacting the metallic substrate with the autodeposition composition of claim 1 for a time effective to form a layer comprised of the epoxy resin, acrylic resin and epoxy curing agent on the metallic substrate and curing said layer to form said coating.

14. The method of claim 13 wherein said autodeposition composition is additionally comprised of at least one autodeposition accelerator.

15. The method of claim 13 wherein said curing is performed at a temperature of between about 130° C. and 240° C.

16. A method of making an autodeposition composition comprising the steps of:

(a) contacting an acrylic resin dispersion with at least one additive selected from the group consisting of surfactants and coalescing solvents to form a conditioned acrylic resin dispersion; and (b) combining the conditioned acrylic resin dispersion with an epoxy resin dispersion comprised of water, at least one epoxy resin and at least one epoxy curing agent to form the autodeposition composition.

17. The method of claim 16 wherein said acrylic resin dispersion is contacted in step (a) with at least one surfactant and at least one coalescing solvent.

18. The method of claim 16 wherein said epoxy resin dispersion is additionally comprised of a surfactant and said acrylic resin dispersion is contacted in step (a) with said surfactant.

19. The method of claim 16 wherein said epoxy resin dispersion is additionally comprised of a coalescing agent and said acrylic resin dispersion is contacted in step (a) with said coalescing agent.

20. An autodeposition composition comprising;

a) water;

b) at least one epoxy resin in dispersed form, prepared by reacting a diglycidyl ether of a polyhydric phenol, a flexibilizing epoxy resin, and a chain extender containing at least two epoxy reactive groups selected from hydroxyl, carboxylic acid, carboxylic acid anhydride and combinations thereof;

c) at least one acrylic resin in dispersed form; and d) at least one epoxy curing agent;

wherein at least one acrylic resin is contacted in dispersion form with at least one additive selected from the group consisting of surfactants and coalescing solvents before being combined with the epoxy resin and epoxy curing agent.

21. The autodeposition composition of claim 20 wherein said epoxy resin, said acrylic resin, and said epoxy curing agent are present in a weight ratio of acrylic resin: (epoxy resin+epoxy curing agent) of from 5:95 to 60:40.

22. The autodeposition composition of claim 20 comprising one or more epoxy resins conforming to the general chemical structure:

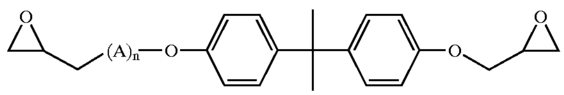

wherein A is

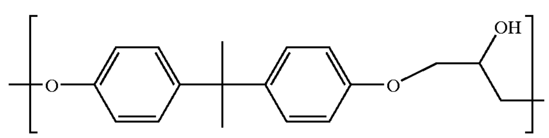

and "n" is 0 or an integer from 1 to 50.

* * * * *

UNITED STATES PATENT AND TRADEMARK OFFICE

CERTIFICATE OF CORRECTION

PATENT NO. : 6,645,633 B2
APPLICATION NO. : 09/964181
DATED : November 11, 2003
INVENTOR(S) : Weller et al.

It is certified that error appears in the above-identified patent and that said Letters Patent is hereby corrected as shown below:

Column 14, line 55, delete "where" and insert therefor --wherein--.

Signed and Sealed this

Twenty-seventh Day of February, 2007

JON W. DUDAS

*Director of the United States Patent and Trademark Office*